US008868569B2

(12) United States Patent
Chandiramani et al.

(10) Patent No.: US 8,868,569 B2
(45) Date of Patent: Oct. 21, 2014

(54) METHODS FOR DETECTING AND REMOVING DUPLICATES IN VIDEO SEARCH RESULTS

(75) Inventors: Sapna Chandiramani, Karnataka (IN); Prateeksha Uday Chandraghatgi, Karnataka (IN); Ishwar Sridharan, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 516 days.

(21) Appl. No.: 12/712,149

(22) Filed: Feb. 24, 2010

(65) Prior Publication Data
US 2011/0208744 A1 Aug. 25, 2011

(51) Int. Cl.
*G06F 17/30* (2006.01)

(52) U.S. Cl.
CPC ...... *G06F 17/30784* (2013.01); *G06F 17/3084* (2013.01)
USPC ........................................ 707/749

(58) Field of Classification Search
USPC ................................. 707/741, 749
See application file for complete search history.

(56) References Cited

U.S. PATENT DOCUMENTS

| 6,240,424 | B1 | 5/2001 | Hirata | |
|---|---|---|---|---|
| 7,260,263 | B1 | 8/2007 | Jafarkhani et al. | |
| 7,739,295 | B1 * | 6/2010 | Agrawal et al. | 707/768 |
| 7,801,893 | B2 * | 9/2010 | Gulli' et al. | 707/737 |
| 7,962,491 | B1 * | 6/2011 | Shen | 707/749 |
| 2003/0187836 | A1 | 10/2003 | Ikeda | |
| 2004/0024758 | A1 | 2/2004 | Iwasaki | |
| 2006/0200475 | A1 | 9/2006 | Das et al. | |
| 2006/0253431 | A1 * | 11/2006 | Bobick et al. | 707/3 |
| 2007/0266001 | A1 * | 11/2007 | Williams et al. | 707/2 |
| 2007/0271224 | A1 | 11/2007 | Essafi et al. | |
| 2008/0033932 | A1 * | 2/2008 | DeLong et al. | 707/5 |
| 2009/0313239 | A1 | 12/2009 | Wen et al. | |
| 2010/0031086 | A1 * | 2/2010 | Leppard | 714/15 |
| 2010/0131499 | A1 | 5/2010 | van Leuken et al. | |
| 2010/0131500 | A1 | 5/2010 | van Leuken et al. | |

OTHER PUBLICATIONS

Wu, Xiao, Alexander G. Hauptmann, and Chong-Wah Ngo. "Practical elimination of near-duplicates from web video search." Proceedings of the 15th international conference on Multimedia. ACM, 2007.*

Manku, Gurmeet Singh, Arvind Jain, and Anish Das Sarma. "Detecting near-duplicates for web crawling." Proceedings of the 16th international conference on World Wide Web. ACM, 2007.*

(Continued)

*Primary Examiner* — Usmaan Saeed
*Assistant Examiner* — Nan Hutton
(74) *Attorney, Agent, or Firm* — Hickman Palermo Truong Becker Bingham Wong LLP

(57) ABSTRACT

Duplicate video search results are detected and removed. Digital signatures are generated for each video content item of a video content corpus. Duplicates are determined for the top n previously received queries by determining the similarity of video content items that are within the same results set of each particular query of the top n previously received queries. Similarities are calculated between any two video documents of the result set of the particular query by measuring the difference between the digital signatures of two video documents. If a similarity between two videos is determined to be above a particular threshold, then the two videos are considered duplicates of each other and the search index is updated by retaining the most relevant of the video documents to the particular query. The less relevant video documents are flagged as duplicates with respect to the particular query.

16 Claims, 2 Drawing Sheets

(56) References Cited

OTHER PUBLICATIONS

Naturel, Xavier, and Patrick Gros. "A fast shot matching strategy for detecting duplicate sequences in a television stream." Proceedings of the 2nd international workshop on Computer vision meets databases. ACM, 2005.*

Park et al., "Re-Ranking Algorithm Using Post-Retrieval Clustering for Content Based Image Retrieval," Elsevier Science Ltd, 2003, 18 pages.

Deng Cai, et al., "Hierarchical Clustering of WWW Image Search Results Using Visual, Textual and Link Information," International Multimedia Conference, Proceedings of the 12th annual ACM international conference on Multimedia, 2004, 8 pages.

* cited by examiner

METHODS FOR DETECTING AND REMOVING DUPLICATES IN VIDEO SEARCH RESULTS

FIELD OF THE INVENTION

The present invention relates to searching video content.

BACKGROUND

Search engines help a user to locate information. Using a search engine, a user may enter one or more search query terms and obtain a list of resources that contain or are associated with subject matter that matches those search query terms. To find the most relevant files, search engines typically attempt to select, from among a plurality of files, files that include many or all of the words that a user entered into a search request.

The list of resources that search engines return based upon a particular query may vary. For example, a search engine might return links that are associated with items that include but are not limited to web pages, online documents, web applications, and multimedia objects. As multimedia becomes more ubiquitous on the Internet, the search results that are returned might include an increasing number of multimedia objects. For example, submitting a query for the term "ford" may return results in the categories of websites, images, music, and videos. One difficulty that affects a search engine's return multimedia content (including but not limited to images, video, and music) results is that the multimedia content is often difficult to classify. For example, web pages often have text and outbound links that a search engine may readily analyze in order to determine the subject matter of the content of the web page. Multimedia content might not have text that could be used to help classify the multimedia content. The lack of text in the multimedia content makes the multimedia content items difficult to distinguish from each other.

With increasing broadband speeds and computing power, the availability of multimedia content on the Internet has greatly expanded. Users are more likely to initiate searches with the goal of locating multimedia content, and video content in particular. Sometimes, though, duplicates of the same video content items may be included within the search results that are returned for a particular search query. Duplicates in video search results may decrease the amount of unique results for the user and lessen the effectiveness of the search with respect to the user. With too many duplicates returned, a user may be tempted to try other search engines for the video search. Thus, enhancements that generate more effective search results by removing duplicate results for video content have become increasingly important.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
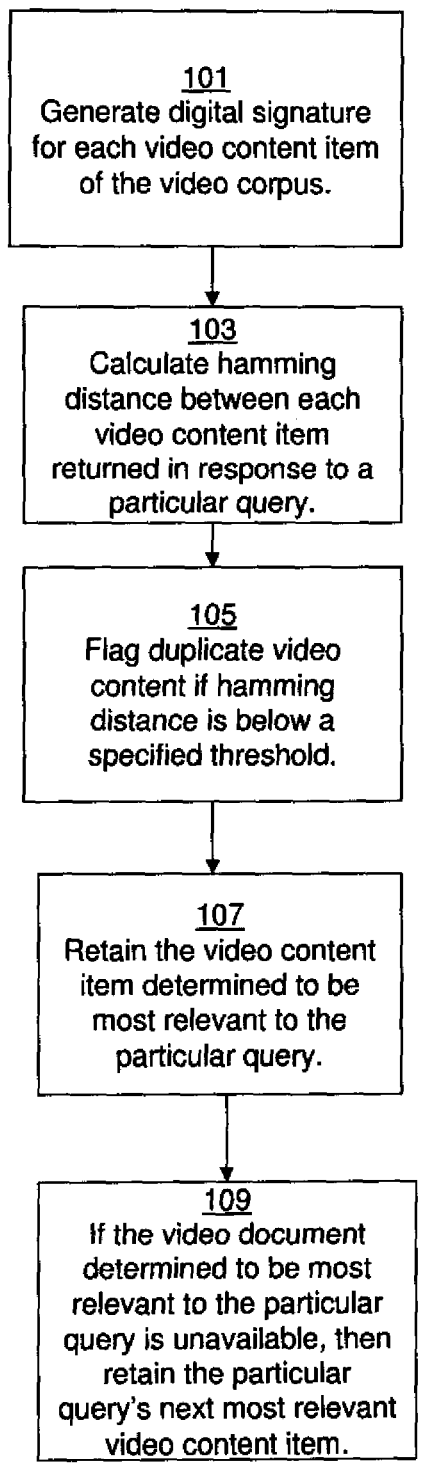
FIG. 1 is a flow diagram illustrating steps for identifying duplicate video content item within an image results set, according to embodiments of the invention.

Techniques are described to detect and remove duplicates within video search results. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques and methods are described herein that improve the search results of a query for video content by minimizing the appearance of duplicate video content items in the search results. Categorizing and labeling a video content item might often be difficult because video content items often do not have significant identifying metadata associated therewith. For example, under some circumstances, the only available information for a particular video content item might be the name of the file, the size of the file, and the type of video file compression used. Other information, such as a description of the content or tags that describe the subject matter of the video content, might not be present for analysis. Therefore, methods are disclosed herein for determining whether a particular video content item is a duplicate of another video content item in a set of video content items that are to be returned in response to a particular query.

In an embodiment, digital signatures are generated for the corpus of video content items that may be returned in a search results set. If the digital signatures are the same or very similar for two video content items, then the video content items are deemed to be duplicates of each other. This process is referred to herein as "near duplicate detection." All but one of the video content items that are deemed to be duplicates of each other may be removed from the corpus of video content. If the digital signatures indicate that a very large proportion of the video content items in the corpus are duplicates, then a different function may be used to generate digital signatures that are less likely to lead to duplicate detection in cases where duplication does not actually exist.

In an embodiment, duplicates are determined by comparing the digital signatures of video content items that are within a set of search results returned in response to a particular query. After initial digital signatures have been generated for the video content items in the set, the extent of similarity between any two video content items in the set is calculated. If the extent of similarity between two video content items is determined to be above a specified threshold, then the two video content items are considered to be duplicates of each other. This pair-wise computation of similarity extents for every possible combination of two video content items in the search corpus is highly accurate but may be computationally impractical if the sample size is excessive. By limiting the sample size to the results set to be returned in response to a particular query, techniques described herein are better able to detect many more duplicates in a very efficient manner.

Near Duplicate Detection

In an embodiment, a video search index contains a separate thumbnail (a compressed, reduced-dimension sample) for each video content item in the search corpus. A separate digital signature is generated for each such thumbnail. Each digital signature may be a value of a mathematical function, such as a hash function, that is applied to a video content item for which the digital signature is being generated. The same mathematical function may be applied to each video content item in the search corpus. Thus, if two video content items contain identical content (even if the limited metadata associated with those video content items, such as the filenames of those video content items, differ), then the digital signatures generated for the two video content items also will be identical. The value returned by the mathematical function may contain a varying number of bits. Generally, values of a digital signature with a higher number of bits indicate more information about the video content than values of digital signatures that have a fewer number of bits. In an embodiment, digital signatures with a high number of bits are calculated in order to improve accuracy.

The digital signature may be determined based upon applying the mathematical function to the video content itself or to other information that is directly related to the video content. In an embodiment, a digital signature for a video content item is determined based upon a thumbnail of that video content item. A thumbnail is a representative image that may be a reduced sized picture of a representative frame of the video content. A representative frame of a video content item may be found in a variety of ways, and is not limited to the techniques described hereinafter. The representative video frame may be the first frame of the video content, the frame that is at the midway point of the video content, or the last frame of the video content, for example. The representative video frame may also be the frame that is shown at a particular percentage of the way into a video content item (for example, the representative video frame for each video content item may be selected to be the frame that is shown at the point when 30% of that video content item has been played). The representative video frame may be determined based upon features of the frame. For example, the frame that shows the most characters may be selected. For another example, the frame shown after a scene change may be selected. Any technique in which a representative frame may be determined may be used in order to generate a thumbnail for a particular video content item. In another embodiment, the digital signature is determined based upon the video content item itself (in its entirety). In another embodiment, the digital signature is determined based at least in part upon metadata (e.g., filename) associated with the video content item.

The digital signature is used to determine the similarity of one video content item to another video content item. For example, the value returned by the mathematical function may be a bit stream of a particular length. If a first video content item was identical to a second video content item, then the digital signatures returned as a result of the application of the mathematical function to each of the video content items would be identical. If a first video content item was very similar, but not identical, to a second video content item, then the digital signatures calculated for those video content items would be very similar as well. However, the differences between the two video content items that are very similar may be so small that a user might be unable to detect the differences between those video content items. Under such circumstances, the video content items are effectively duplicates. Thus, video content items having the same or very similar digital signatures may be categorized as being duplicates of each other.

This technique is able to reduce the number of duplicates that appear within search results that are displayed to a user. However, duplicates not removed may still appear within search results. These missed duplicates may occur due to thumbnails with minor positional variations or color differences that the digital signature fails to represent. Within a result set returned in response to a query, these duplicates may appear to be even more pronounced.

In an embodiment, a duplicate video content item removal technique involves analyzing the top n popular queries (e.g., the queries that have been most submitted by users) offline (i.e., asynchronously from users' actual real-time submission of those queries). For each of the popular queries, the top x results within each of the ranked result sets that were returned in response to those popular queries are considered. Techniques are applied to mark duplicate video items within the result sets returned in response to a particular query.

In an embodiment, a secondary digital signature for a video content item is generated based upon a revised mathematical function that is more sensitive than an original mathematical function that was initially used to generate a primary digital signature for that video content item. The increased sensitivity of the revised mathematical function causes the revised mathematical function to produce secondary digital signatures that are usable to detect even more duplicates within the result set returned in response to a particular query. In an embodiment, fewer bits are used to generate the secondary digital signatures. Because fewer bits are considered, less important information may be ignored in the generation of the secondary digital signature. This results in the secondary digital signature mapping to a larger number of duplicate video items and hence, decreasing the number of duplicate videos that may appear in a particular query's result set. Unfortunately, use of the more sensitive digital signature in duplicate detection may also result in a larger number of false positives be detected—situations in which video content items are mistakenly deemed to be duplicates of each other when they are not actually duplicates of each other.

Pair-Wise Comparison of Video Content

In an embodiment, each video content item's digital signature is retained and compared to the digital signatures of all other video content items within a video content corpus. Use of the digital signatures in the comparison detects similarities between any two video content items of a result set of a particular query. The extent of similarity between two video content items may be calculated by determining the number of positions in each of the two digital signatures that contain different bits. For example, the bits in the first position of each digital signature may be compared to see whether they indicate the same value, the bits in the second position of each digital signature may be compared to see whether they contain the same value, and so on, for all of the positions of each digital signature. The similarity value resulting from the bit-wise comparison of two digital signatures is referred to herein as the "hamming distance." If the extent of similarity between two video content items is sufficient (or, in other words, if the calculated hamming distance is less than a specified threshold), then the two video content items are considered to be duplicates of each other.

This pair-wise computation of similarities for each video content item is highly accurate but may be computationally impractical if the sample size is excessive. For example, if the digital signatures of all of the video content items in the entire video content corpus were compared to each other, then the quantity of computations required could be impractical. In an embodiment, the sample size is limited to the video content items that are within a result set that is to be returned in response to a particular query. In an alternative embodiment, the sample size is limited to the top x results in the ranked result set to be returned in response to the particular query. This limited sampling technique results in many duplicates being detected in a very efficient manner.

In an embodiment, duplication of video content items within the video search corpus are represented in the following query-specific manner:

Video content item A is flagged as a duplicate for the query q1.

Video content item D is flagged as a duplicate for the query q2.

Under this circumstance, video content item A would be removed from the search results set for query q1, and video content item D would be removed form the search results set for query q2. However, it would be possible for video content item A to appear within the search results of query q2, as video content item A was not flagged as a duplicate for query q2 (only for q1).

In an embodiment, for a particular set of video content items that have been declared as duplicates of each other for a query q, the video content item that is determined to be the most relevant within that particular set is retained while all other video content items in the particular set are marked as being duplicates for query q in the index. For example, if video content item A and video content item B are determined to be duplicates for query q1, and if video content item A is found to be more relevant to query q1 than video content item B is, then video content item A would be retained while video content item B would be flagged as a duplicate relative to query q1. This assures that the video with the most relevance to query q1 is retained.

Video content items returned within search results may be dynamic in the sense that the video content item corpus will be updated when additional video content items become available and/or when some video content items become unavailable (e.g., due to the placement or removal of those video content items on various storage devices accessible via the Internet). Continuing the above example, video content item A (which is more relevant to query q1 than video content item B is) may subsequently become unavailable. Unavailability of a video content item may occur for a variety of reasons, including the video content item no longer being accessible on a server, or heavy traffic causing access to the video content item to be temporarily suspended. In an embodiment, should the most relevant video content item within a set of duplicate content items be subsequently found to be unavailable, a new most relevant video content item is found within the set of duplicate video content items. This will most often be the second most relevant video content item for the set of duplicate video content items. The new most relevant video content item is then retained in the search index (and marked as being an "original" or "primary" rather than a "duplicate").

Thus, at any point in time, a particular video content item may be been flagged as being a duplicate for anywhere between 0 to n queries. The maximum value of n is the total number of popular queries processed.

In an embodiment, a search engine receives a particular query from a user who submitted the particular query with the intent to search for video content items. At runtime, the search engine executes the particular query against the video corpus of all video content items except for those video documents that have been flagged as duplicates for that particular query. This minimizes the appearance of duplicate video content items within search results while also ensuring computational efficiency when determining duplicate video content.

Example Flow

FIG. 1 is a flow diagram illustrating an example of a near-duplicate detection technique for determining duplicates of video content items for a particular query. In step 101, a server generates digital signatures for each video content item within a video corpus. In step 103, for each particular query in a set of previously submitted queries (e.g., the top n most popular queries), the server determines the hamming distance between the video content items in each possible pair of video content items (or some specified subset thereof) that could appear in the result set for that particular query. The number of queries in the set, and the quantity of pairs for which hamming distances are computed, may vary from one implementation to another implementation. The most popular n queries (and only those, in one embodiment) may be analyzed, and the top x video content item results (and only those, in one embodiment) for each of those queries may be compared to each other to determine hamming distances, for example. In step 105, if the hamming distance between two video content items is below a specified threshold (indicating that the difference in the similarly-positioned bits of the video content items' digital signatures is low), then the server flags the video content items as being duplicates for the particular query. In step 107, the video content item that is determined to be the most relevant to the particular query is retained while all other video content items that are determined to be duplicates of that video content item are flagged (e.g., in an index that the search engine uses to select search results for submitted queries) as duplicates for the particular query. In step 109, if the server finds that the most relevant video content is no longer available, the server determines which of the video content items that has been flagged as a duplicate of the most relevant video content item is the next most relevant to the particular query. This next most relevant video content item is then retained in the video search index. The flag that formerly identified that video content item as being a duplicate is removed. As a result of the foregoing technique, more duplicates within video content search results are determined in a computationally efficient manner for particular queries. Better search results are provided to the user.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
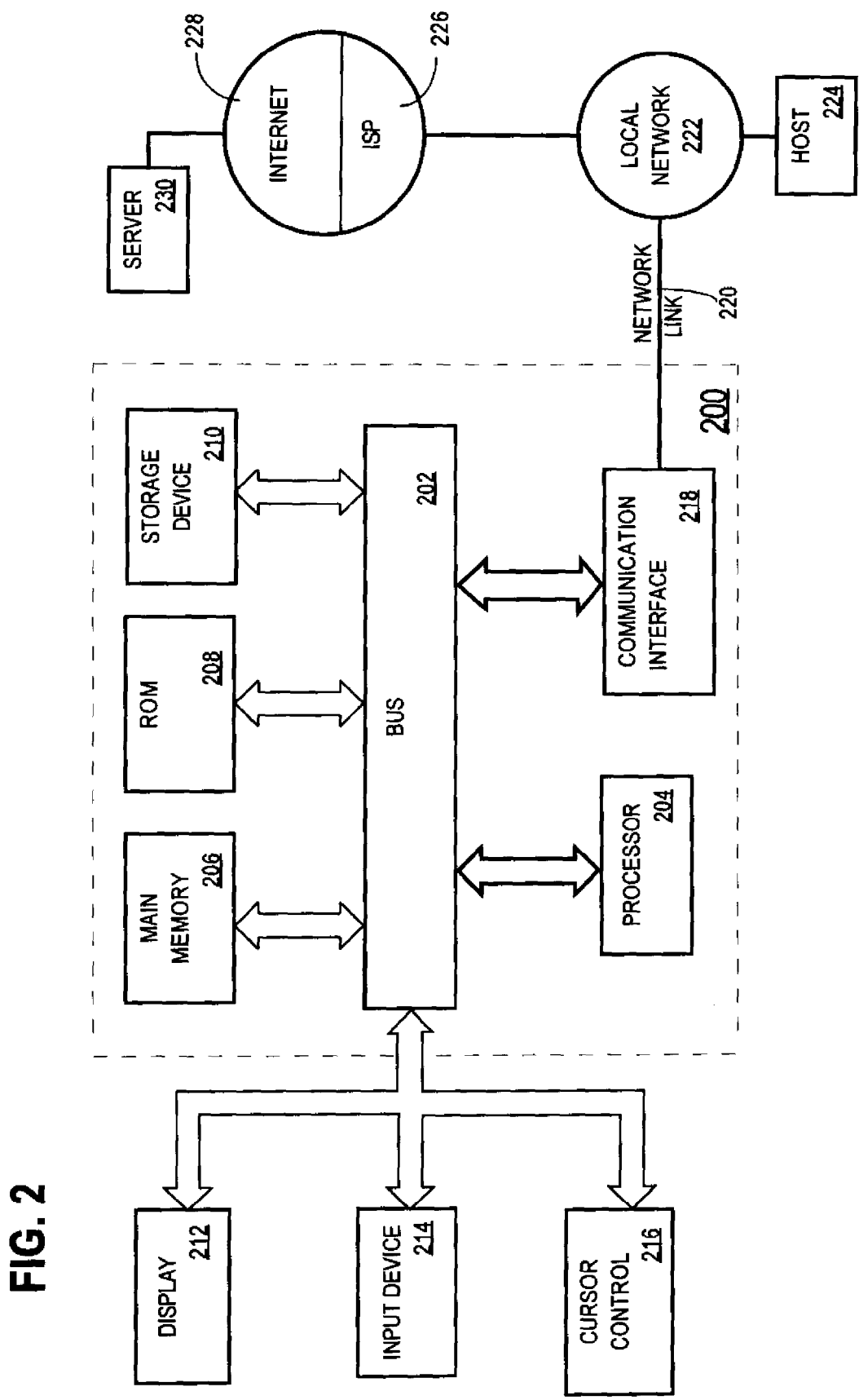
FIG. 2 is a block diagram of a computer system on which embodiments of the invention may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for removing duplicate content items in a result set, the method comprising:
   identifying a subset of content items of a search index based at least upon content items returned in a result set generated by a search engine for a particular query that was previously submitted to the search engine;
   for each content item in the subset, determining a similarity value with respect to all other content items in the subset;
   upon determining that a similarity value of a first content item and a second content item of the subset of content items satisfy a particular threshold value, determining which of the first content item and second content item are less relevant to the particular query; and
   marking, in the search index, the less relevant to the particular query of the first content item and second content item as a duplicate content item for the particular query;
   in response to determining that the more relevant of the first content item and the second content item to the particular query is no longer available:
      determining which of the content items are marked as a duplicate and satisfy the particular threshold value is the most relevant content item to the particular query; and
      updating the search index by removing the mark as duplicate for the most relevant content item to the particular query;
   wherein the method is performed by one or more computing devices.

2. The method of claim 1, wherein the content items are multimedia video content items.

3. The method of claim 1, wherein determining a similarity value further comprises determining a similarity value for the top x content items in the subset based upon relevance.

4. The method of claim 1, wherein the method is performed on only the most popular n queries previously received.

5. The method of claim 1, wherein determining a similarity value further comprises performing:
   generating a digital signature for each content item; and
   calculating the difference in bits between the digital signature for one content item to the digital signature of another content item.

6. The method of claim 1, wherein the similarity value is the hamming distance between content items.

7. The method of claim 1, further comprising:
   removing, from the search index, the more relevant of the first content item and second content item to the particular query that is no longer available.

8. The method of claim 1, wherein the method is performed offline prior to receiving a query from a user.

9. One or more non-transitory computer-readable media storing instructions, which, when executed by one or more processors, cause one or more computing devices to perform:
   identifying a subset of content items of a search index based at least upon content items returned in a result set generated by a search engine for a particular query that was previously submitted to the search engine;
   for each content item in the subset, determining a similarity value with respect to all other content items in the subset;
   upon determining that a similarity value of a first content item and a second content item of the subset of content items satisfy a particular threshold value,
      determining which of the first content item and second content item are less relevant to the particular query; and
   marking, in the search index, the less relevant to the particular query of the first content item and second content item as a duplicate content item for the particular query;
   in response to determining that the more relevant of the first content item and the second content item to the particular query is no longer available:
      determining which of the content items are marked as a duplicate and satisfy the particular threshold value is the most relevant content item to the particular query; and
      updating the search index by removing the mark as duplicate for the most relevant content item to the particular query.

10. The one or more non-transitory computer-readable media of claim 9, wherein the content items are multimedia video content items.

11. The one or more non-transitory computer-readable media of claim 9, wherein instructions for determining a similarity value further comprises instructions for determining a similarity value for the top x content items in the subset based upon relevance.

12. The one or more non-transitory computer-readable media of claim 9, wherein the instructions cause said selecting to be performed on the most popular n queries previously received.

13. The one or more non-transitory computer-readable media of claim 9, wherein instructions for determining a similarity value further comprises instructions for performing:
   generating a digital signature for each content item; and
   calculating the difference in bits between the digital signature for one content item to the digital signature of another content item.

14. The one or more non-transitory computer-readable media of claim 9, wherein the similarity value is the hamming distance between content items.

15. The one or more non-transitory computer-readable media of claim 9, wherein the instructions, when executed by one or more processors, further cause the one or more computing devices to perform:
   removing, from the search index, the more relevant of the first content item and second content item to the particular query that is no longer available.

16. The one or more non-transitory computer-readable media of claim 9, wherein the method is performed offline prior to receiving a query from a user.

* * * * *